Sept. 25, 1951          M. E. HOOD          2,569,378

GAS MIXING DEVICE FOR DRAUGHT BEER DISPENSING

Filed May 15, 1946

INVENTOR.
Myron E. Hood.
BY
Murray, Sackhoff & Paddack.
ATTY.

Patented Sept. 25, 1951

2,569,378

UNITED STATES PATENT OFFICE 2,569,378

GAS MIXING DEVICE FOR DRAUGHT BEER DISPENSING

Myron E. Hood, Cincinnati, Ohio

Application May 15, 1946, Serial No. 669,888

2 Claims. (Cl. 225—1)

1

This invention relates to the art of dispensing draught beer and has for an object the provision of a simple method and means for effecting substantial economies in handling of the beer at the draught tap and in providing uniform and highly desirable characteristics in every glass of beer drawn.

A further object of the invention is to provide an inexpensive means for converting existing pressure draught beer dispensing apparatus to enable the dispensing of all of the beer in each cooperage unit in its finest condition and without having waste or "tail-end" beer involved in the operation.

Another object of the invention is to provide an improved and trouble-free mixer element whereby the pressure gases employed are proportioned in a beer dispensing system.

These and other important objects are attained by the method and means described herein and disclosed in the accompanying drawings, in which.

Figure 1:
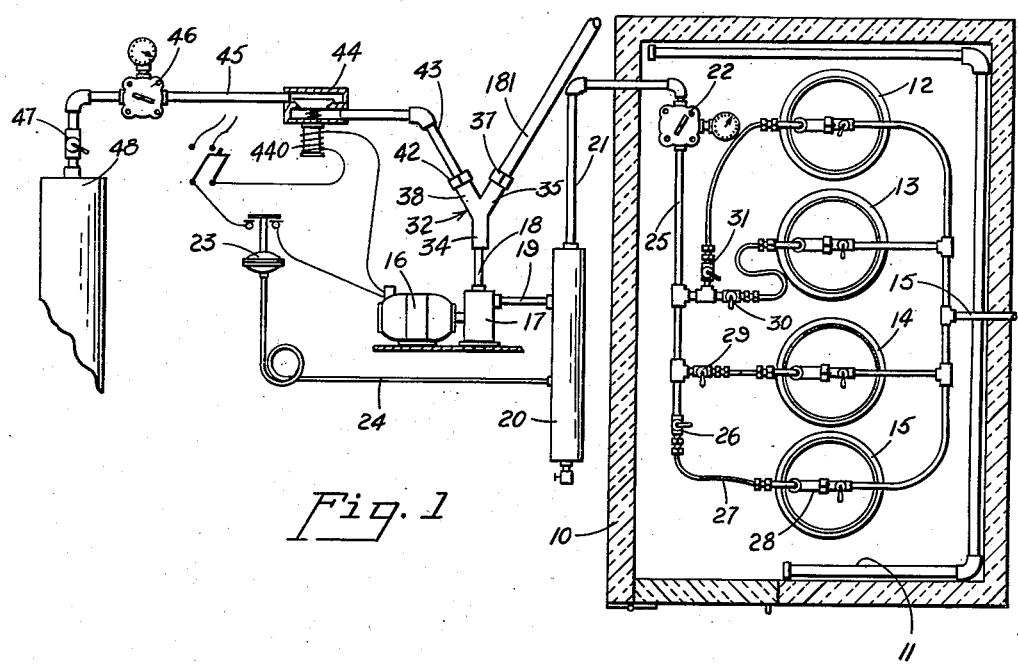
Fig. 1 is a schematic view showing in plan a beer cooler chamber or room, and in elevation a pressure system connected thereto and embodying the invention.
Figure 2:
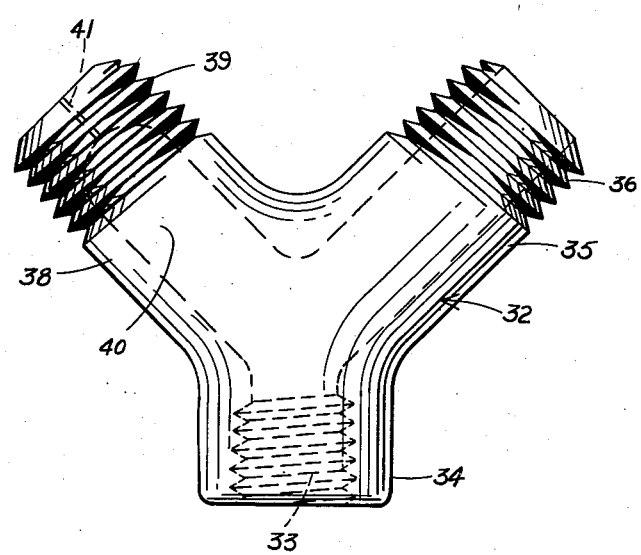
Fig. 2 is an enlarged elevational view of an automatic gas proportioning and mixing unit forming a detail of the invention.

The retailing of draught beer has all along involved certain losses of a direct or an indirect nature due to the problem of so-called "tail-end" beer. "Tail-end" beer occurs, regardless of the original quality of the beverage or the care used in handling and refrigeration, or in the type of known equipment employed in dispensing it, if the keg or other unit is allowed to stand in a partially emptied condition for an appreciable period of time. This "tail-end" beer is found to be either flat, cloudy and unpalatable or excessively wild and foamy depending on the nature of the pressure gas used as the dispensing pressure medium.

By the means and method of the present invention "tail-end" beer is eliminated completely because the entire content of a barrel or keg of draught beer may be drawn off with every glass of beer having all the qualities of clarity, taste, sparkle and flavor originally provided for in its manufacture. This is consistently true regardless of whether the keg or barrel has remained inactively on tap in a largely emptied condition for an extended period of time as during the over-night shut-down period of the emporium. The actual loss of beverage per unit of cooperage is thus consistently limited to a few spoonfuls which can not be drawn through the draw-off pipe.

The method of the invention consists essentially in the step of subjecting the beer on tap in the cooperage unit, viz: barrel, half-barrel, quarter-barrel, or one-eighth barrel, to the pressure of a gaseous medium containing $CO_2$ in the same or nearly the same proportion as the manufacturer of the beverage introduced $CO_2$ into the liquid beverage at the time the beer was placed in the containers for sale.

Draught beer is not pasteurized and it is dependent on relatively uninterrupted refrigeration to retain the unkilled yeast therein from further fermentation. The method of the invention presupposes proper refrigeration to prevent the draught beer from spoiling.

The most common methods of dispensing draught beer utilize air pressure alone. When pressure air alone is used to dispense beer, the $CO_2$ in solution in the beer as sold by the manufacturer may leave the beer and mix with the pressure air on the beer in the container. The loss of $CO_2$ from the beverage to the air progresses at increased rate with the increase of dispensing pressure of the air. The rate of loss of $CO_2$ from the beer also increases as the quantity of beer in the keg diminishes and the volume of dispensing pressure air in the keg increases in the course of drawing off the contents of the keg in the sale of beer by the glass. The normal surface tension of the beer tends to retard but does not preclude the transfer of $CO_2$ from the beer to the air in the keg so that the factors of time and relative proportions of beer and air in the keg are important items which can not be controlled by known methods of dispensing due to irregularities of the draught demand of beer at the bar. Customarily a small amount of beer remaining in the container or keg overnight becomes "tail-end" beer and is considered unfit to be served as such on the following morning and is thrown away by high-class establishments or is mixed in the customer's glass with fresher beer from another container to avoid the loss. Most customers can distinguish this mixture by its altered taste and appearance so that the sale of such a mixture is not on a mutually satisfactory basis.

The other known method of pressure dispensing of draught beer is to utilize a tank of liquid $CO_2$. This method also has disadvantages and losses in that when a reduced quantity of beer is allowed to remain in the keg under the pressure of $CO_2$ gas alone an excess of $CO_2$ is absorbed by the beer and it becomes excessively foamy and wild and in some instances it is impossible, because of wild foam, to draw a full glass of "tail-end" beer from the system. This is true because the beer as sold by the brewer is not completely saturated with $CO_2$ but instead has only a selected average percentage of $CO_2$ deemed sufficient to give the beverage the proper taste and effervescence.

In practicing the method of the invention I prefer to provide for the proportioning of $CO_2$ from a conventional source at the rate of approximately two and one-half per cent (2½%) $CO_2$ to ninety-seven and one-half per cent (97½%) of air passing to the air compressor of a beer dispensing system. This air plus $CO_2$ mixture may be varied slightly to correspond more exactly with the $CO_2$ content of the beer as prepared by a given brewmaster if that percentage be known to the retailer of the beer by the glass. By maintaining in this air-gas pressure dispensing medium a percentage of $CO_2$ closely approximating the percentage of $CO_2$ contained in the beer when racked, the previously mentioned tendency to equalization of the $CO_2$ content in the beer and in the gas-air pressure medium on top of the beer will be very slow and of no consequence since the behavior of the beverage during draught will be the same and the taste, appearance, and other qualities will not be distinguishably altered. This effectively maintains the original qualities of the beer in the container after tapping and until completely emptied regardless of the time required.

For practical purposes it may be noted that as a final step before sealing the retail cooperage unit of beer at the brewery a specified average percentage of $CO_2$ is introduced at high pressure into the beverage while the latter is at low temperature. The actual percentage varies according to the schedules of various brewmasters and breweries generally ranging however from about one and three-fourths per cent (1 and ¾%) to three per cent (3%). I have discovered that while beer will yield up its $CO_2$ constant to plain atmospheric air under pressure and in contact therewith and thus ultimately produce "flat beer," I can prevent the loss of any noticeable percentage of the $CO_2$ from the beer by mixing in the air over the beer in the container a like amount, or approximately so, of $CO_2$ and maintaining this selected percentage of $CO_2$ per volume of air in the container. For practical results and for economy of $CO_2$ supply I have found that approximately two and one-half per cent (2 and ½%) of $CO_2$ mixed in the dispensing pressure air medium will retain in the draught beer in a container all of the desirable properties and characteristics of the product at the time it left the brewery. It will, of course, be remembered that draught beer contains live yeast cells and must be kept suitably refrigerated at all times until it has actually been dispensed to the consumer's glass.

In its broader aspects, the method of the invention consists in providing a pressure dispensing medium for introduction to the top of the beer in the container, which medium consists of a mixture of air and $CO_2$ wherein the percentage of $CO_2$ in the pressure medium approximates the average percentage of $CO_2$ contained in the beer. Where beers from several makers are dispensed by means of a common pressure source I have found that a $CO_2$ content of from 2.25% to 2.75% yields excellent results, and is neither expensive nor difficult to maintain in the system.

As a means for facilitating the maintenance of the aforementioned condition I have provided a relatively inexpensive gas-air mixer which can be incorporated at relatively low expense in an existing beer cooling and dispensing installation. Reference is made to Fig. 1 wherein a suitably insulated chamber 10 provided with refrigeration coils 11 in known manner is adapted to contain a number of cooperage units 12—13—14 and 15 all connected with and ready to be dispensed through the beer pipe line 15 leading to the draught tap or faucet (not shown). The existing pressure system comprising a motor 16, driving a compressor 17 and having an air intake conduit 18 is connected by a pipe 19 with pressure tank 20. Pressure line 21 leads from tank 20 to the interior of refrigerated chamber 10 wherein there is usually provided a pressure regulator and gauge 22 of known design. A high and low pressure limit switch 23 controls the starting and stopping of motor 16 and is responsive to predetermined high and low pressures in pressure tank 20 to which it is connected by tube 24 in conventional manner. Leading from the pressure regulator and gauge 22 is a common pressure line 25 which in this instance is provided at one end with a shut-off valve and coupling 26 to which is connected the flexible pressure hose 27 of tap unit 28 for the barrel or keg 15. In a corresponding manner the shut-off valve and the coupling 29 serves to provide dispensing pressure supply to barrel 14 when desired. Branch connections from common pressure line 25 are equipped with valve and coupling members 30 and 31 to selectively supply the units 13 and 12 respectively. The foregoing may be considered typical of a conventional pressure dispensing installation.

In adapting such a typical pressure dispensing installation to the method of the invention I have devised an inexpensive means for automatically proportioning and mixing the desired amount of $CO_2$ with the atmospheric air which enters pipe 18 to compressor 17. The intake line 18 ordinarily extends to some remote point where fresh clean air may be secured for the supply to the compressor. The extension 181 of the air supply line is cut at some convenient point and the gas-air mixer 32 of the invention is connected into said air supply line. Mixer 32 is superficially formed after the fashion of a pipe Y connection having an internally threaded bore 33 on the leg 34 which is coupled to the air intake line 18 closest the compressor 17. The leg 35 of gas-air mixer 32 has a tapered end and an external thread 36 for receiving a suitable coupling or union 37 whereby fresh air intake pipe 181 is connected. The remaining leg 38 of the gas-air mixer is provided with a tapered end and an external thread 39 but the passage 40 thereof which may be of the same diameter as the passage in leg 35, is closed off save for a restricted drilled bore 41. Leg 38 is connected by means of a suitable coupling 42 to a tube 43 which is connected to the outlet side of a solenoid valve 44. The inlet tube 45 of valve 44 has a pressure regulator and gauge 46 connected into it and is provided with conventional valve and coupling mechanism 47 for connection with a tank of liquid $CO_2$ commonly available on the markets. The solenoid coil 440 of solenoid valve 44 is connected in electrical series with the compressor motor 16 which is under the control of the pressure responsive switch 23 so that valve 44 is open whenever the compressor 17 is in operation and said valve 44 closes instantaneously with the deenergization of the motor. By the arrangement just described a controlled amount of $CO_2$ regulated by pressure regulator 46 may be passed through valve 44 when it is open. This issues through the small drilled hole 41 which communicates with the passage 40 of the gas-air mixer 32 where it expands and freely mixes with the incoming suction air passing from fresh air line 181 into the passage in leg 35. The air and the $CO_2$, now in gaseous form, enter the mixer 32 at an angle of approximately 90° and are drawn into the compressor as a proportioned mixture from whence they are driven under pressure to the pressure storage tank 20.

In the simplest embodiment of the gas-air mixer as shown I prefer that the small bore 41 be drilled to provide the desired diameter of orifice for roughly proportioning the intake of $CO_2$ to the intake of the compressor. The percentage of $CO_2$ in the mixture is controlled initially by the size of orifice 41 with relation to the size of the opening from the mixer 32 to the air compressor. A further adjustment of this percentage is effected by means of regulator 46 which allows the $CO_2$ to pass at a greater or less pressure through valve 44 to orifice 41. When the average $CO_2$ percentage in the draught beer to be dispensed is known, the $CO_2$ supply to the gas air pressure medium can be adjusted to the same percentage if desired. Thereafter the normal operation of pressure switch 23 automatically controls the supply of $CO_2$ in the proper proportion whenever the compressor is in operation. For practical purposes orifice 41 may have a cross-sectional area which is 1.75% of the minimum cross-sectional area of the intake to the pump. Where the lbs. per sq. in. pressure on the regulator gauge 46 is set the same as the intake suction pressure of the pump a 1.75% $CO_2$ gas-air mixture results. When the regulator and gauge 46 is adjusted above the known suction intake pressure on the compressor the $CO_2$ percentage is increased in known degree. The pressure supply of gas-air mixture in tank 20 is delivered at a suitable pressure obtained by adjustment of regulator 22 in the refrigerating chamber 10 and this is supplied uniformly to the cooperage units then on tap. As beer is drawn from a given unit such as 12, the space which it occupied is replaced with the gas-air mixture wherein the $CO_2$ is proportioned to the air substantially as the $CO_2$ in the beer as manufactured. Thus there is no opportunity for an appreciable change in the $CO_2$ content of the beer which is thus subject to delivery in its prime condition to the faucet at the bar.

What is claimed is:

1. Draft beer dispensing apparatus comprising a pressure storage tank, a pressure distribution line connected with the tank and provided with a regulator for supplying predetermined dispensing pressure to containers of beer connected with said distribution line, a compressor and motor unit for delivering a mixture of air and gas under pressure to the storage tank, an electrical control switch for the motor responsive to predetermined high and low pressure limits in said tank, the compressor having an intake port, a gas-air mixer having an outlet passage connected with said compressor intake port, said mixer having a pair of angularly related inlet passages forming a common Y-connection with said outlet passage in the mixer, integral means at the outer end of one of said inlet passages providing a minute gas orifice, means to supply $CO_2$ gas to said orifice whereby the admitted gas may flow through the remainder of said inlet passage in expanded state and at reduced pressure, and a fresh air supply line connected to the remaining inlet port to admit atmosphere air into complete mixture with the expanded gas in advance of discharge through the outlet passage to the intake port of the compressor.

2. In a draft beer dispensing apparatus the combination with a pressure storage tank for supplying dispensing pressure to containers of draught beer, of a motor driven compressor for loading said pressure storage tank, the compressor having an intake port, a fresh air supply line, a supply line for compressed $CO_2$ gas and a gas-air mixer body having a pair of inlet passages of substantially equal diameter and in angularly related communication and further having an outlet passage connecting the junction of the inlet passages with the intake port of the compressor, one of said inlet passages having its outer end restricted to a minute gas orifice whereby the remainder of said passage functions as a pressure reducing expansion chamber for gas independently of the other inlet passage, said gas orifice connected with said gas supply line, said fresh air supply line connected to the said other of said inlet passages for introducing air into intimate and complete mixture with the expanded $CO_2$ gas.

MYRON E. HOOD.

REFERENCES CITED

The following references are of record in the file of this patent:

UNITED STATES PATENTS

| Number | Name | Date |
|---|---|---|
| 619,133 | Burke | Feb. 7, 1899 |
| 2,031,849 | Oleary | Feb. 25, 1936 |
| 2,213,812 | Harper | Sept. 3, 1940 |

FOREIGN PATENTS

| Number | Country | Date |
|---|---|---|
| 9,436 | Great Britain | May 13, 1895 |
| 107,623 | Germany | Jan. 4, 1900 |
| 520,907 | Great Britain | May 7, 1940 |